(12) United States Patent
Vasseur et al.

(10) Patent No.: US 9,317,378 B2
(45) Date of Patent: Apr. 19, 2016

(54) PRE-COMPUTATION OF BACKUP TOPOLOGIES IN COMPUTER NETWORKS

(71) Applicant: Cisco Technology Inc., San Jose, CA (US)

(72) Inventors: Jean-Philippe Vasseur, Saint Martin D'Uriage (FR); Jonathan Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 14/338,079

(22) Filed: Jul. 22, 2014

(65) Prior Publication Data

US 2016/0026542 A1  Jan. 28, 2016

(51) Int. Cl.
| | | |
|---|---|---|
| *G06F 11/00* | (2006.01) | |
| *G06F 11/14* | (2006.01) | |
| *H04L 29/08* | (2006.01) | |

(52) U.S. Cl.
CPC ........ *G06F 11/1464* (2013.01); *H04L 67/1095* (2013.01); *G06F 2201/805* (2013.01)

(58) Field of Classification Search
CPC .................................................. G06F 2201/805
USPC ........................... 714/4.11, 4.1, 4.12, 4.3, 4.5
See application file for complete search history.

(56) References Cited

U.S. PATENT DOCUMENTS

| | | | | |
|---|---|---|---|---|
| 7,751,396 B2 * | 7/2010 | Kakani | .................. | H04L 12/189 370/390 |
| 2008/0075010 A1 * | 3/2008 | Song | ..................... | H04W 40/02 370/238 |
| 2010/0067374 A1 * | 3/2010 | Elangovan | .......... | H04L 12/1886 370/230 |
| 2012/0307629 A1 | 12/2012 | Vasseur et al. | | |
| 2013/0016758 A1 | 1/2013 | Hui et al. | | |
| 2013/0124883 A1 * | 5/2013 | Addepalli | ................. | G06F 1/28 713/310 |
| 2013/0132542 A1 * | 5/2013 | Zhang | ..................... | H04L 45/04 709/223 |
| 2014/0244129 A1 * | 8/2014 | Filev | ..................... | B60K 31/00 701/93 |

OTHER PUBLICATIONS

O. Gnawali et al., "The Minimum Rank Objective Function With Hysteresis" (IETF May 3, 2011).
Oana Iova et al., "Efficient Energy-Balancing in Multipath RPL," *ALGOTEL* (2014).
Ritwik Majumder et al., "Power Sharing and Control in Distributed Generation With Wireless Sensor Networks" (IEEE Transactions on Smart Grid, Oct. 17, 2011).
P. Pan et al., "Fast Reroute Extensions to RSVP-Te for LSP Tunnels" (The Internet Society, May 2005).
P. Thubert, "RPL Objective Function 0" (IETF May 5, 2011).
J.P. Vasseur et al., "Routing Metrics Used for Path Calculation in Low-Power and Lossy Networks," (IETF, Mar. 2012).

(Continued)

*Primary Examiner* — Dieu-Minh Le
(74) *Attorney, Agent, or Firm* — Samuel M. Katz

(57) ABSTRACT

In one embodiment, a method includes: receiving, at a device of a computer network, a request to build at least part of a backup directed acyclic graph (BDAG) of backup devices for routing traffic within the computer network in case of a power outage, the request comprising at least one requirement specifying to use a device remaining powered after the power outage as a backup device; and in response to receiving the request: identifying a set of backup devices, each of the backup devices fulfilling the at least one requirement; selecting a backup device from the set of backup devices; and synchronizing the device with the backup device according to a backup operation strategy received from the backup device.

23 Claims, 7 Drawing Sheets

(56) References Cited

OTHER PUBLICATIONS

T. Winter et al., "RPL: IPv6 Routing Protocol for Low-Power and Lossy Networks," (IETF, Mar. 2012).

"IEEE Standard for Local and Metropolitan Area Networks—Part 15.4: Low-Rate Wireless Personal Area Neworks (LR-WPANS)," IEEE Std 802.15.4 (Sep. 5, 2011).

"IEEE Standard for Local and Metropolitan Area Networks—Part 15.4: Low-Rate Wireless Personal Area Neworks (LR-WPANS)," Amendment 3: Physical Layer (PHY) Specifications for Low-Data-Rate, Wireless, Smart Metering Utility Networks, IEEE Std 802.15.4g (Apr. 27, 2012).

* cited by examiner

US 9,317,378 B2

PRE-COMPUTATION OF BACKUP TOPOLOGIES IN COMPUTER NETWORKS

TECHNICAL FIELD

The present disclosure generally relates to computer networks, and, more particularly, to pre-computation of a backup topologies in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL" (pronounced "ripple"), which is a distance vector routing protocol that can build a Directed Acyclic Graph ("DAG")—in some instances, a Destination Oriented DAG (or "DODAG")—in addition to a set of features to bound control traffic, support local (and slow) repair, etc. The RPL architecture provides a flexible method by which each node can perform DODAG discovery, construction, and maintenance.

Power outage management is one of the important features utilities look for when deploying applications/infrastructure implemented as LLNs. Such LLNs comprise heterogeneous devices with various lifetimes in the event of a power outage. Current recovery approaches for LLNs include "Restoration" where backup or alternate paths for routing traffic within the LLN are computed "on-the-fly" using backup parents in case of failure of the preferred next-hop. Another approach is "Protection" where backup paths are pre-computed (i.e. prior to a power outage) and used for routing traffic upon detection of a power outage.

BRIEF DESCRIPTION OF THE FIGURES

The embodiments herein may be better understood by referring to the following description in conjunction with the accompanying drawings in which like reference is numerals indicate identically or functionally similar elements, of which.

DESCRIPTION OF EXAMPLE EMBODIMENTS

Overview

Figure 1:
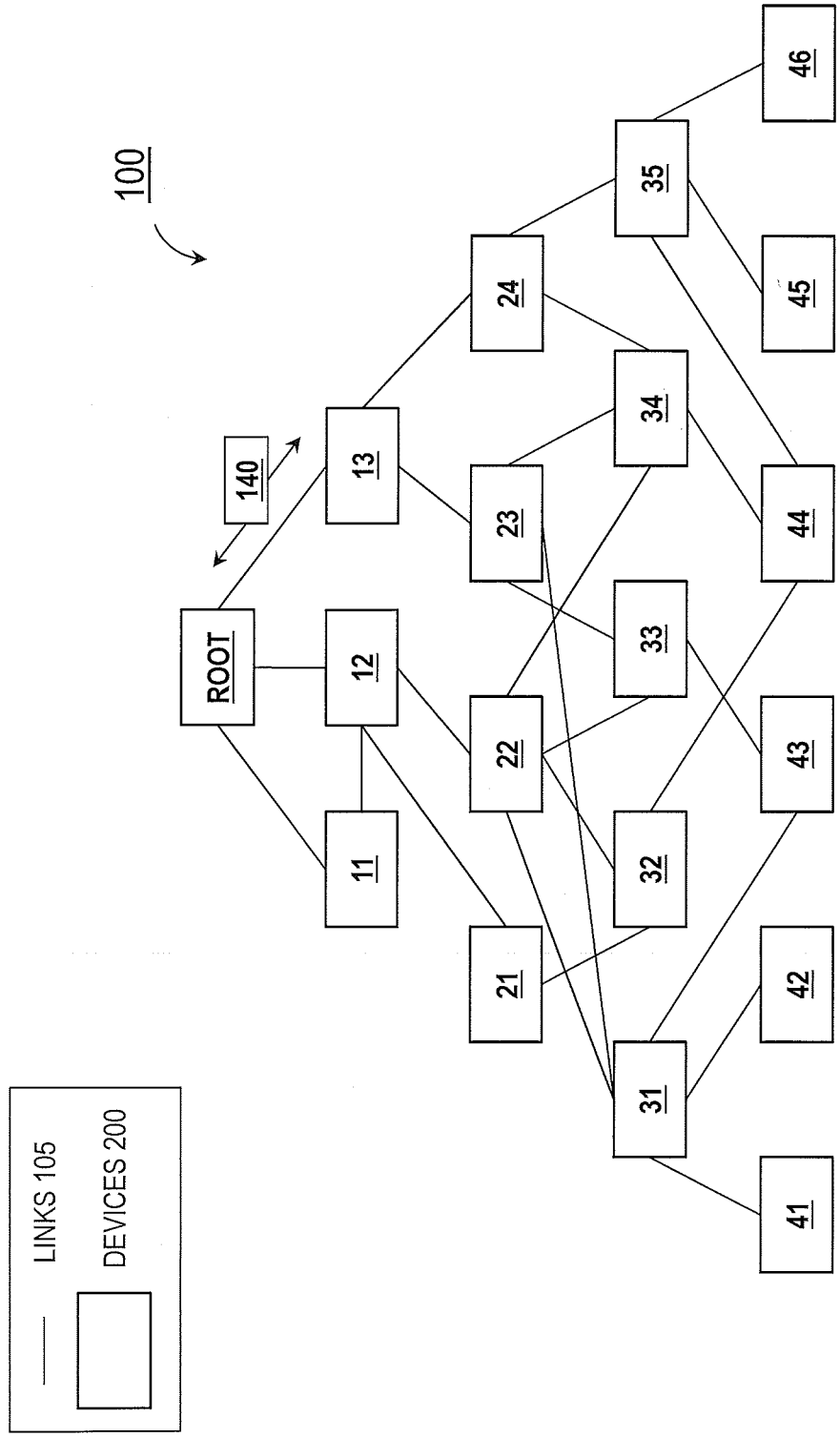
FIG. 1 illustrates a computer network according to an example embodiment.

In one embodiment, a method includes: receiving, at a device of a computer network, a request to build at least part of a backup directed acyclic graph (BDAG) of backup devices for routing traffic within the computer network in case of a power outage, the request comprising at least one requirement specifying to use a device remaining powered after the power outage as a backup device; and in response to receiving the request: identifying a set of backup devices, each of the backup devices fulfilling the at least one requirement; selecting a backup device from the set of backup devices; and synchronizing the device with the backup device according to a backup operation strategy received from the backup device.

DETAILED DESCRIPTION OF EXAMPLE EMBODIMENTS

A computer network is a geographically distributed collection of nodes or devices (both terms being interchangeably used hereinafter in the present application) interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, considerably affecting the bit error rate (BER);

2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, and/or a low power supply (e.g., battery).

In other words, LLNs are a class of network in which both the routers and the nodes are constrained: LLN routers typically operate with constraints, e.g., processing power, memory, and/or energy (battery), and the nodes are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" (RPL) by Winter, at al. (Mar. 13, 2011 version), provides a mechanism that supports multipoint-to-point (MP2P) traffic from devices inside the LLN towards a central control point (e.g., LLN Border Routers (LBRs) or "root devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed acyclic graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g., number of parents, backup parents, etc.).

In addition, the routing protocol may advertise one or more metrics/constraints for which the DAG is to be optimized. Also, the routing protocol may allow an optional set of constraints to be included for computing a constrained path, such as, for example, if a link or a node does not satisfy a required constraint, it is "pruned" from the candidate list when computing the best path. Alternatively, the constraints and metrics may be separated from the OF. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. If a node is unable to comply with an objective function or does not support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). An example for how routing metrics and constraints may be obtained may be found in an IETF Internet Draft, entitled "Routing Metrics used for Path Calculation in Low Power and Lossy Networks" by Vasseur, et al. (Mar. 1, 2011 version). Further, an example OF (e.g., a default OF) may be found in an IETF Internet Draft, entitled "RPL Objective Function 0" by Thubert (May 5, 2011 version) and "The Minimum Rank Objective Function with Hysteresis" by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the RPL protocol, a DODAG Information Object (DIO) is a type of DAG discovery message that carries information that allows a node to discover an RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

An example implementation of LLNs is an "Internet of Things" network. Generally, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature, it has been of the utmost importance to extend the IP protocol suite for these networks.

Power outage management is one of the important features utilities look for when deploying applications/infrastructure implemented as LLNs (IoT networks). As noted above, this new generation of IoT networks may comprise a plurality of heterogeneous devices such as, for example, but without limiting the generality of the invention, main-powered meters, range extenders, distribution automation gateways (DA-gateways), etc. with some or all of them being equipped with a backup battery unit. Upon power outage, devices present in such mesh networks will start dying at different rates depending on the capacity and/or the remaining power present in their backup battery units. For instance, a smart meter typically may have a lifetime of few dozens of seconds, while gateways and/or range extenders equipped with backup battery units may have a lifetime of several hours. Therefore, in a situation where such mesh networks are configured as a plurality of DAGs, the increasing unavailability of the devices will lead to having a series of DAGs, each with a different lifetime, getting more and more scattered in terms of connectivity and consequently network capacity. Current recovery approaches for LLNs include "Restoration" where backup or alternate paths for routing traffic within the LLN are computed "on-the-fly" using backup parents in case of failure of the preferred next-hop. Another approach is "Protection" where backup paths are pre-computed (i.e. prior to a power outage) and used for routing traffic upon detection of a power outage.

The techniques described herein introduce a recovery approach useful for power outage management in which backup topologies are pre-computed using devices/nodes equipped with backup battery units coupled with a priori knowledge of the re-routed traffic. Such an approach increases the resiliency of IoT mesh networks leading to new network topologies where a network administrator and/or an end user may even start adding devices equipped with backup battery units in order to further increase said network resiliency. Furthermore, this approach would lead to faster convergence time as well as maintaining the quality of service for the traffic during power outage.

Power Outage Backup Directed Acyclic Graph (BDAG)

According to one or more embodiments of the disclosure as described later in greater detail, different backup paths are pre-computed for building a power outage backup topology (backup directed acyclic graph or BDAG) for a computer network comprising a plurality of devices. A root device may request that a BDAG be built and optimized based on one or more requirements (i.e. one or more metrics and optionally some constraints) defined in an Objective Function (OF). Devices part of the computer network may receive the request and in response, select one or more preferred next-hops to be used in case of power outage. During the next-hops selection process, different requirements (e.g. constraints and/or metrics) may be taken into consideration such as the next-hops characteristics (e.g. battery operated devices), link capacity, backup traffic, etc. Finally, a BDAG is built and usable for routing traffic in case of a power outage.

Reference is now made to FIG. 1 which is a schematic block diagram of an example computer network 100 according to an embodiment of the present invention. Illustratively, the computer network 100 comprises devices 200 (e.g., labeled as shown, "Root," "11," "12," . . . "45," "46," and described in greater detail below in FIG. 2) interconnected by various methods of communication. For instance, the links 105 may be shared media (e.g., wireless links, PLC links, etc.), where certain nodes 200, such as, e.g., routers, sensors, computers, etc., may be in communication with other nodes 200. Those skilled in the art will understand that any number of nodes, devices, links, etc. may be used in the computer network, and that the view shown herein is in the interests of simplicity. Also, while the embodiments are shown herein with reference to a generally "tree" shaped network, the description herein is not so limited, and may be applied to networks that have branches extending in all directions from a generally centralized root node among a plurality of surrounding nodes.

Data packets 140 (e.g., traffic and/or messages sent between the devices/nodes) may be exchanged among the devices of the computer network 100 using predefined network communication protocols such as certain known wireless protocols (e.g., IEEE Std. 802.15.4 (or 15.4 g), WiFi, Bluetooth®, etc.) or other shared media protocols where appropriate (e.g., PLC). In this context, a protocol consists of a set of rules defining how the nodes interact with each other.

Figure 2:
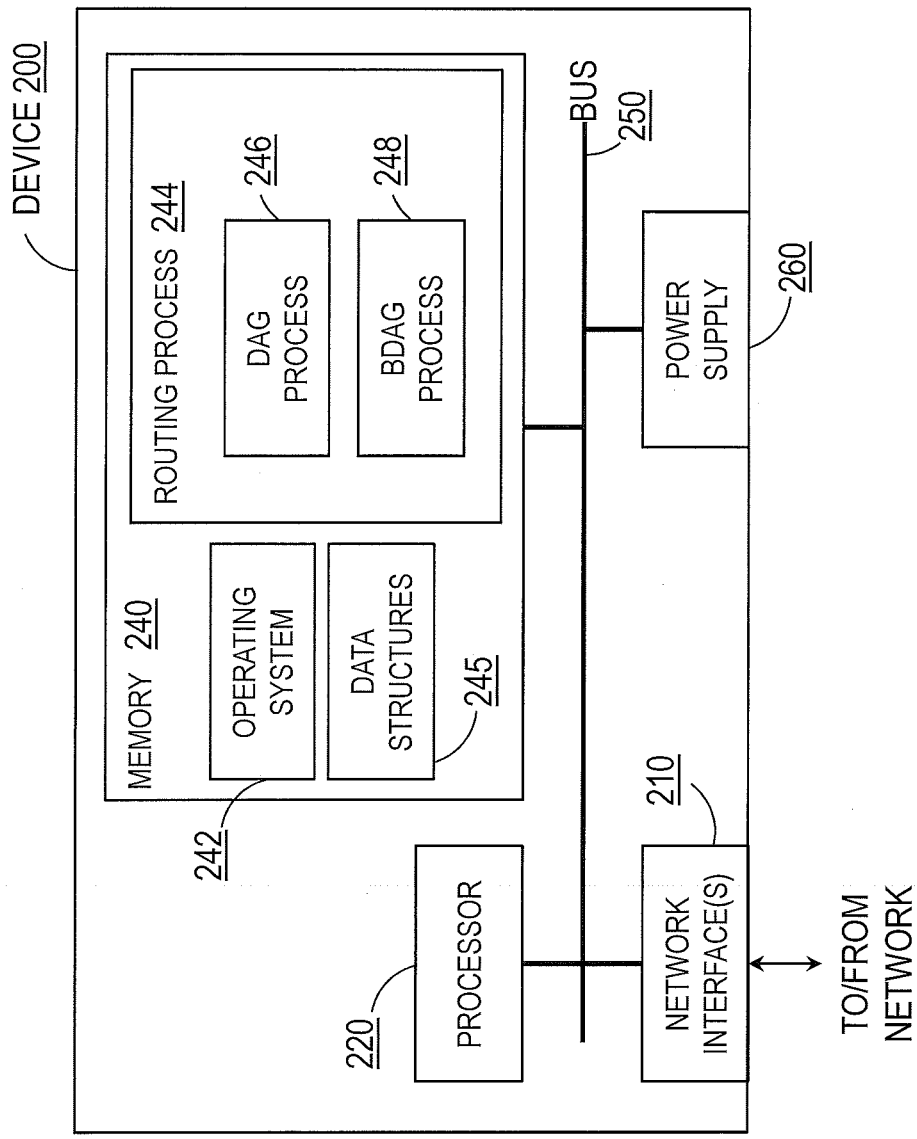
FIG. 2 illustrates a network device/node according to an example embodiment.

Reference is now made to FIG. 2 which is a schematic block diagram of an example device 200 that may be used with one or more embodiments described herein, e.g., as a source-routing device such as the root device or other source-route head-end device. The device may comprise one or more network interfaces 210 (e.g., wireless), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly, via PLC, etc.). The network interfaces may be configured to transmit and/or receive data using a variety of different communication protocols, particularly depending upon the underlying transmission medium (e.g., wireless, PLC, wired, etc.). Note, further, that a node may have two different types of network interfaces/connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device. For instance, these software processes and/or services may comprise routing process/services 244, which may include a directed acyclic graph (DAG) process 246 in certain embodiments, and also a backup directed acyclic graph (BDAG) process 248 as described herein.

In the above description of FIG. 2, the different blocks are set forth in order to provide a thorough understanding of the various principles of the present invention. However, those skilled in the art will appreciate that not all these details are necessarily always required for practicing the present invention or limited to this particular configuration. In this instance, well-known circuits, control logic, and the details of computer program instructions for conventional algorithms and processes have not been shown in detail in order to not obscure the general concepts unnecessarily. Furthermore, the different components which are, for clarity, described separately may also be provided in combination in a single component. Conversely, various components of the invention which are, for brevity, described in a single component may also be provided separately. Furthermore, although described as being implemented as software processes, it will be appreciated by those skilled in the art that the processes may be implemented in hardware as well. For example, a further memory may be provided such as a read only memory (ROM) or any other static storage (e.g. programmable ROM, erasable programmable ROM, and electrically erasable programmable ROM, etc.) coupled to the bus for storing other processes for the processor 220. The device 200 may comprise a further memory or storage device such as a magnetic hard disk, or a removable media drive (e.g. floppy disc drive, read-only compact disc drive, read/write compact disc drive, compact disc jukebox, tape drive, and removable magneto-optical drive), etc. coupled to the bus for other processes.

Further, it will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets and the less capable devices simply forward the packets as directed.

To communicate (e.g., exchange data packets 140), two devices 200 may use a frequency/channel-hopping technique. Frequency-hopping, also referred to as "frequency-hopping spread spectrum" (FHSS) or channel-hopping, is a method of transmitting radio signals by rapidly switching a carrier among numerous frequency channels, e.g., using a pseudo-random sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

In general, in frequency-hopping wireless networks, time frames are divided within a frequency-hopping sequence into regular timeslots, each one operating on a different frequency. A reference clock may be provided for the time frames for an entire network (e.g., mesh/cell), or at least between pairs of communicating devices. A MAC layer of each node 200 divides time into timeslots that are aligned with the timeslot boundary of its neighbor. Also, each timeslot may be further divided into sub-timeslots (Note that not all frequency-hopping systems use sub-timeslots, and devices can begin transmission at any time within a timeslot). Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc).

A device in the frequency-hopping network configures its receiver to follow a hopping schedule by picking a channel sequence, duration of each time slot, and time base that defines when the first slot in the schedule begins. To then communicate a packet, the transmitter and receiver must be configured to the same channel during the packet transmission. All devices in a given network may utilize the same hopping schedule (i.e. all devices are configured to use the same channel sequence, time slot duration, and a common time base), resulting in a network where all communication in the network at any given point in time utilizes the same channel.

Alternatively, each transmitter-receiver pair may utilize different hopping schedules (i.e., each pair may differ in channel sequence, time slot duration, and/or time base), such that transmitter-receiver pairs may communicate at the same time but on different channels. For instance, each device in the channel hopping network may individually pick its own hopping schedule parameters independent of any other node.

A device synchronizes its hopping schedule with another device by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time.

Figure 3:
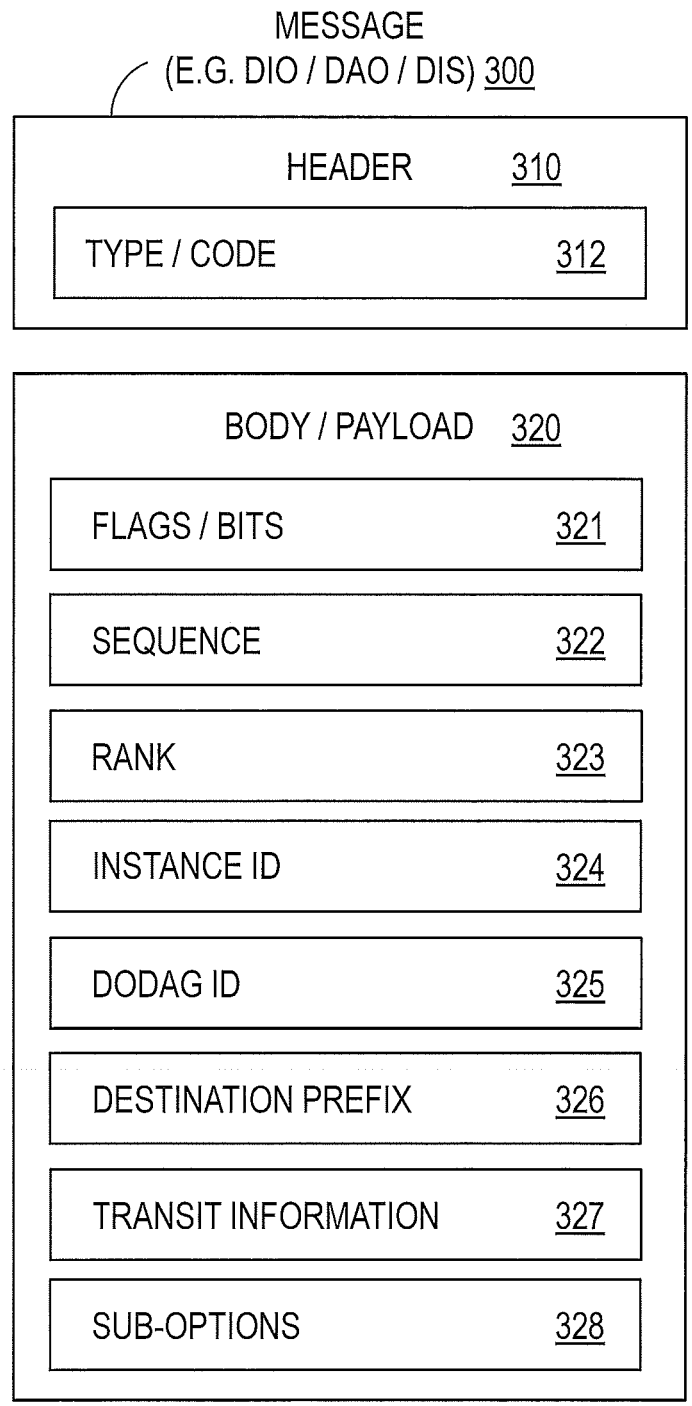
FIG. 3 illustrates a message according to an example embodiment.

Reference is now made to FIG. 3 which illustrates an example simplified control message format 300 that may be used for discovery and route dissemination when building a BDAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, sub-option field 328 may be defined as an objective code point (OCP) sub-option field within a DIO to carry codes specifying a particular objective function (OF) to be used for building the associated BDAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
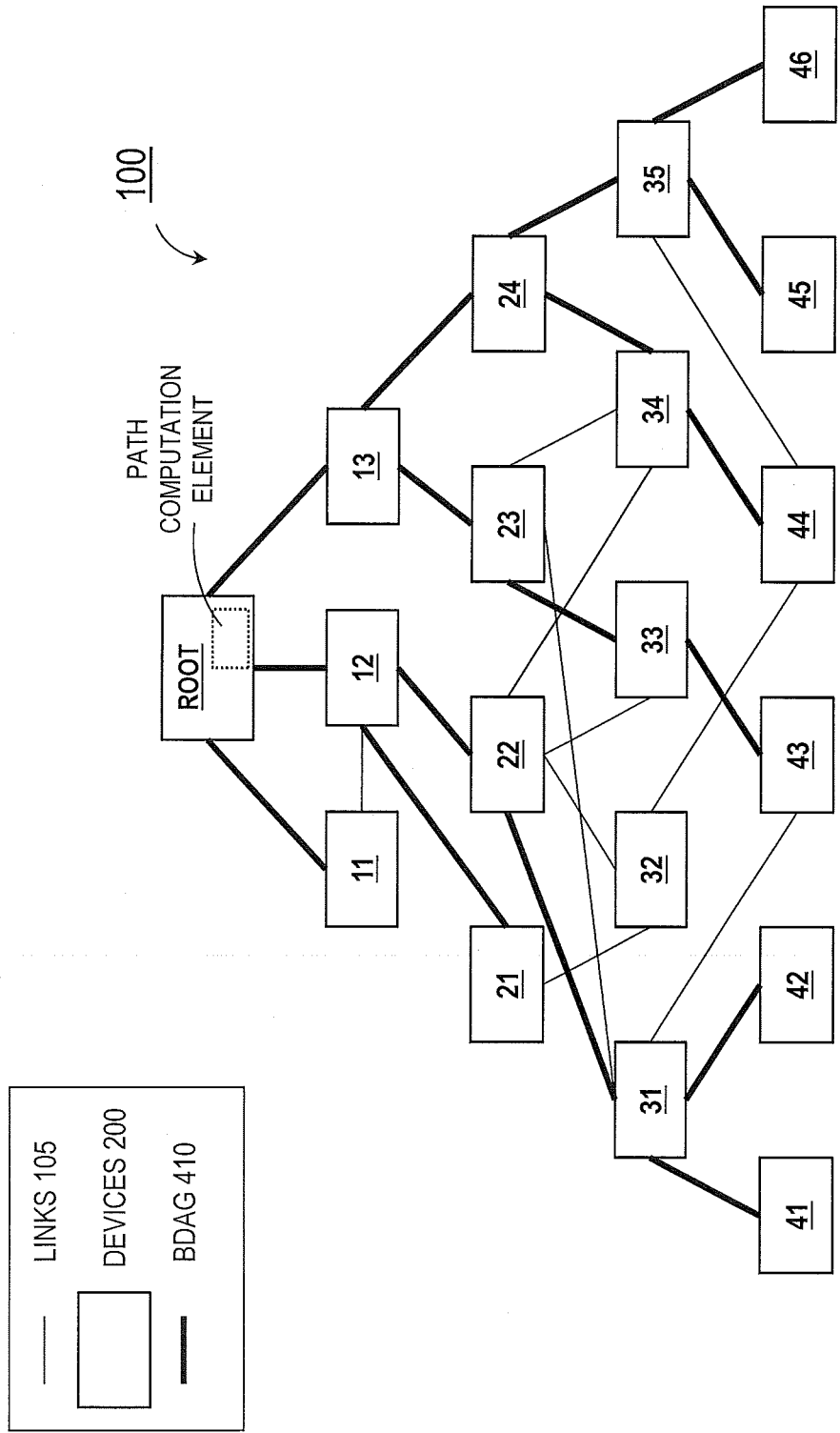
FIG. 4 illustrates a backup directed acyclic graph (BDAG) in the computer network constructed and operative in accordance with an example embodiment.

Reference is now made to FIG. 4 which illustrates an example simplified BDAG 410 that may be created, e.g., through the techniques described above, within network 100 of FIG. 1. For instance, certain links 105 may be selected for each node to communicate with a particular parent (and thus, in the reverse, to communicate with a child, if one exists). These selected links form the BDAG 410 (shown as bolded lines), which extends from the root node toward one or more leaf nodes (nodes without children). Traffic/packets 140 (shown in FIG. 1) may then traverse the BDAG 410 in either the upward direction toward the root or downward toward the leaf nodes.

RPL supports two distinct modes of operation: a storing mode and a non-storing mode. In the storing mode, each node provides information to its BDAG parent(s) about the prefix(es)/address(es) that it is associated with. Upon receiving this information, each node populates its routing table in support of downward routing (routing packets in the DOWN direction—as previously discussed, UPWARD routing is performed by sending packet along the BDAG toward the BDAG root). Conversely, in the non-storing mode, nodes do not store routing information (except parents' next hops in support of the BDAG and UPWARD routing). This allows for memory saving on intermediate nodes and is particularly suited to (although not restricted to) P2MP and MP2P traffic. Indeed, when a node sends a packet upward (e.g., to a concentrator potentially co-hosted with the BDAG root or a network management server (NMS)), the packet simply follows the BDAG. In the opposite direction (e.g., packets sent by the NMS to a meter or a set of meters), since intermediate nodes do not store routes, the packets are source routed. For instance, the chosen route is set forth within the packet's header (e.g., an IPv6 header), according to a source-routing head-end node's routing decision.

Typically, a root device of a BDAG may request the creation of the BDAG based on a certain OF, such as through a BDAG discovery request (e.g. DIO) 300. For instance, the OF may include requirements on how to select one or more preferred next-hop devices 200 for the BDAG. For example, but without limiting the generality of the invention, metrics may comprise delay, latency, bandwidth, estimated transmission count (ETX), and cost, while constraints, if used, may comprise various reliability thresholds, restrictions on battery operation, multipath diversity, load balancing requirements, bandwidth requirements, transmission types (wired, wireless, etc.), and number of selected next-hops. Devices 200 of the computer network 100 may then receive the request and build their portion of the BDAG by, e.g., selecting one or more preferred next-hops, based on the OF included in the request. Notably, the included OF may actually consist of a default OF, or a null OF, in which case the receiving devices operate in a configured manner to handle requests without specified OFs. Illustratively, the techniques described herein may be performed by hardware, software, and/or firmware, such as in accordance with a DAG process 246 and/or BDAG process 248, which may comprise computer executable instructions executed by the processor 220 of either a root device or a device 200 within the DAG and/or BDAG to perform functions relating to the novel techniques described herein, e.g., in conjunction with the routing process 244.

When pre-computing backup paths in order to build a BDAG usable in case of power outage, additional parameters have to be taken into consideration. As noted above, a power outage may have a different impact on the devices 200 of the computer network 100. Specifically, some of the devices 200 may be affected by the power outage (and remain powered for a certain duration) while others may not be affected at all. In one embodiment of the present invention, an indicator characterizing the nature of a device/node 200 may be specified using the Node State and Attribute (NSA) object defined in an IETF Internet Draft, entitled "Routing Metrics used for Path Calculation in Low Power and Lossy Networks"<RFC6551> by Vasseur, et al. (Feb. 12, 2013 version). Therefore, each node/device 200 of the computer network 100 may comprise an indicator (e.g. specific bit set or flag) specifying if and how the node is affected by a power outage. For example, but without limiting the generality of the invention, three different flags may be provided: an SL flag (Short Lived) for devices 200 having a lifetime under a certain threshold value after power outage (e.g. a smart meter may have an SL flag since its remaining lifetime is less than thirty seconds after a power outage); an ML flag (Medium Lived) for devices 200 having a lifetime over said threshold value (e.g. a DA-gateway and/or range extender having a remaining lifetime of a few hours after a power outage may have an ML flag); and an LL flag (Long Lived) for devices 200 not affected by a power outage. Those skilled in the art will appreciate that the present invention in embodiments thereof is not limited to this particular configuration and that additional indicators may be specified to refine if and how a node/device 200 may be affected by a power outage.

Additionally and/or alternatively, additional TLVs may be specified—and provided as part of the sub-option field 328—to advertise additional information related to the nature of a particular device. For example, a TLV may include the estimated battery lifetime and/or remaining life which may be useful for networks having heterogeneous battery operated devices (i.e. devices equipped with a backup battery unit). In another non-limiting example, a TLV may indicate which distribution feeder and/or phase a device is connected to. Knowledge of the distribution feeder is typically useful for building a BDAG that follows the electrical distribution topology. Indeed, the next-hop selection process for a particular device may be refined by "pruning" next-hop candidates (e.g. the distribution feeder) that may be affected by the same power outage.

Figure 5:
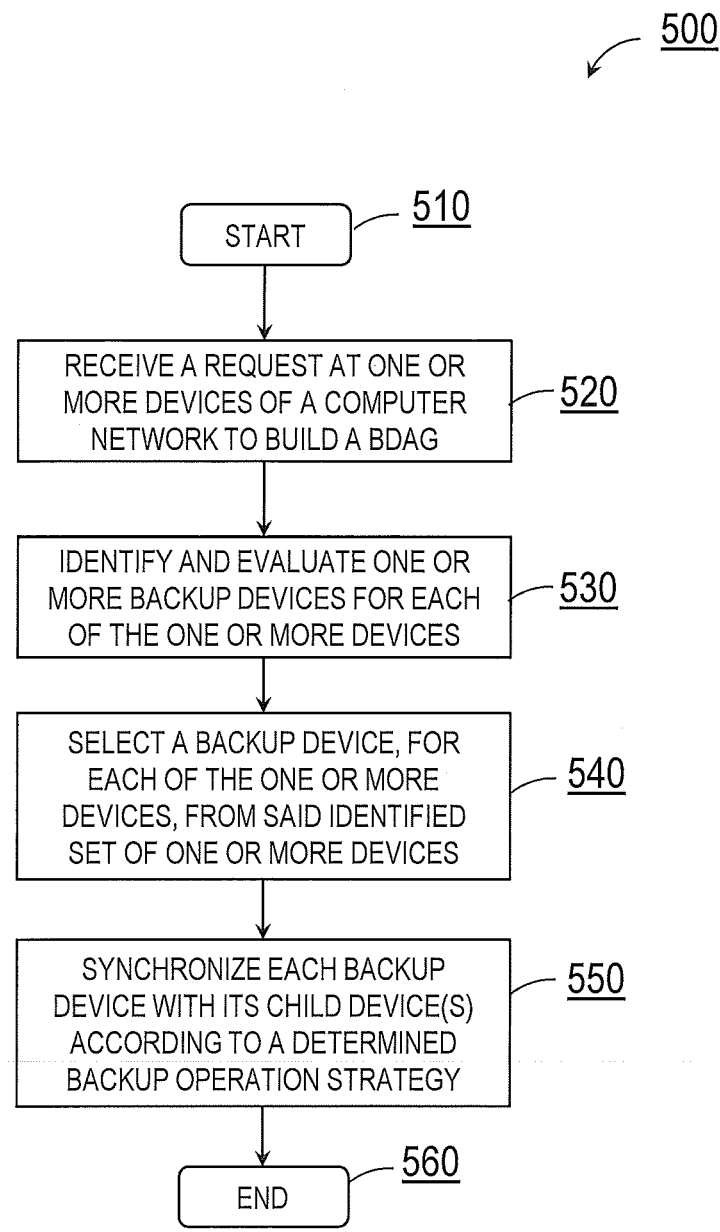
FIG. 5 is a flow chart diagram of a BDAG process used for building a BDAG in accordance with an example embodiment.

Reference is now made to FIG. 5 which is a flow chart diagram of a BDAG process 500 used for building a BDAG according to an embodiment of the present invention.

The process starts at step 510 and then continues at step 520 where one or more devices 200 within the computer network 100 (e.g. an IoT network) receive a request to build a BDAG usable in the event of power outage. Typically, backup paths are pre-computed to build a BDAG based on a certain OF, such as through a BDAG discovery request (e.g., DIO) 300.

Then, at step 530, some or all devices 200 of the computer network 100, which received the request, start identifying and evaluating one or more next-hop candidates, based on the OF included in the request. When building a BDAG to be used in the event of a power outage, the nature of the next-hop candidates may be taken into consideration. Indeed, when a first device (e.g. a child device) evaluates a second device (e.g. a parent device) as a next-hop candidate (hereinafter referred as a backup device) to receive re-routed traffic in case of power outage, the first device has to be select a second/backup device that will not be affected by the power outage or a second/backup device that has enough remaining battery power to receive the re-routed traffic for at least a certain duration. Therefore, the OF may comprise one or more further requirements (e.g. constraints) relevant to the nature of the backup devices. An example constraint may be to avoid devices having an SL flag i.e. that will run out of power quickly after a power outage. Another example may be to avoid devices having an SL flag and devices having an ML flag thereby leading to a situation where the devices having an LL flag will be the only ones considered as potential backup devices. A further example may be to choose devices having a TLV, indicating the estimated battery remaining lifetime/power, is more than a certain threshold. Another example may be to choose a particular device having a TLV indicating that the particular device has not the same distribution feeder. Those skilled in the art will appreciate that the present invention is not limited to the examples given hereinabove and that additional constraints may be defined to take into consideration the nature of the backup devices. Each device 200 which receives the request may therefore identify a set a backup devices by reading the indicators and/or TLVs of the candidate backup devices. At the end of this step, a set of backup devices that fulfill the specified one or more requirements is identified for each device 200 that received the request to build a BDAG.

At step 540, a backup device is selected (either by one or more devices that received the request or by a path computation element (PCE) located at a particular node within the network), from among the set of backup devices, for each device 200 of the computer network 100 that received the request to build the BDAG. Typically, the backup device which best satisfies the one or more metrics (and fulfills the one or more requirements) of the OF is selected for each device 200.

Finally, at step 550, each backup device synchronizes with its child device(s) according to a backup operation strategy. Typically, a backup operation strategy is determined for each backup device of the BDAG. Determining a backup operation strategy typically includes determining an amount of re-routed traffic that a backup device will receive after a power outage from a child device 200 as well as determining at least one unicast schedule for routing the re-routed traffic from the child device 200 to the backup device. Those skilled in the art will appreciate that a particular device may be selected as a backup device by one or more child devices. In such a situation, the overall amount of re-routed traffic that the backup device will receive in case of power outage is computed and then, used to determine the amount of re-routed traffic to receive from each of its child devices. Once done, the backup device is able to compute its unicast and broadcast schedules for receiving the re-routed traffic from its backup child devices. Optionally, a backup traffic policy may also be taken into consideration by the backup device (and provided to the child device(s) along and/or as part of the backup operation strategy) in order to discard some data packets 140 of the re-routed traffic. Indeed, the backup device may not be able to handle all the re-routed traffic and therefore, may decide to discard some data packets 140 as specified by the traffic policy. Additionally and/or alternatively, the traffic policy is communicated to the child device(s) and certain data packets 140 are not routed to the backup device.

Furthermore, at step 550, each backup device of the BDAG synchronizes the determined allocated link capacity and unicast schedule with its backup child devices thereby enabling each backup device-child device pair to communicate. Typically, a backup device (respectively a child device 200) synchronizes its hopping schedule with a child device (respectively a backup device) by communicating its channel sequence, time slot duration, and current time within the hopping schedule. Hopping schedule parameters may be communicated in explicit synchronization packets and/or piggybacked on existing data packets. As mentioned, some of these parameters (e.g., channel sequence) may be network-wide and implicit. Backup devices and child devices 200 may store these parameters to know what channel to use for transmission at a particular time. At the end of step 550, the BDAG is built and ready to be used in the event of a power outage.

The process ends at step 560.

Figure 6:
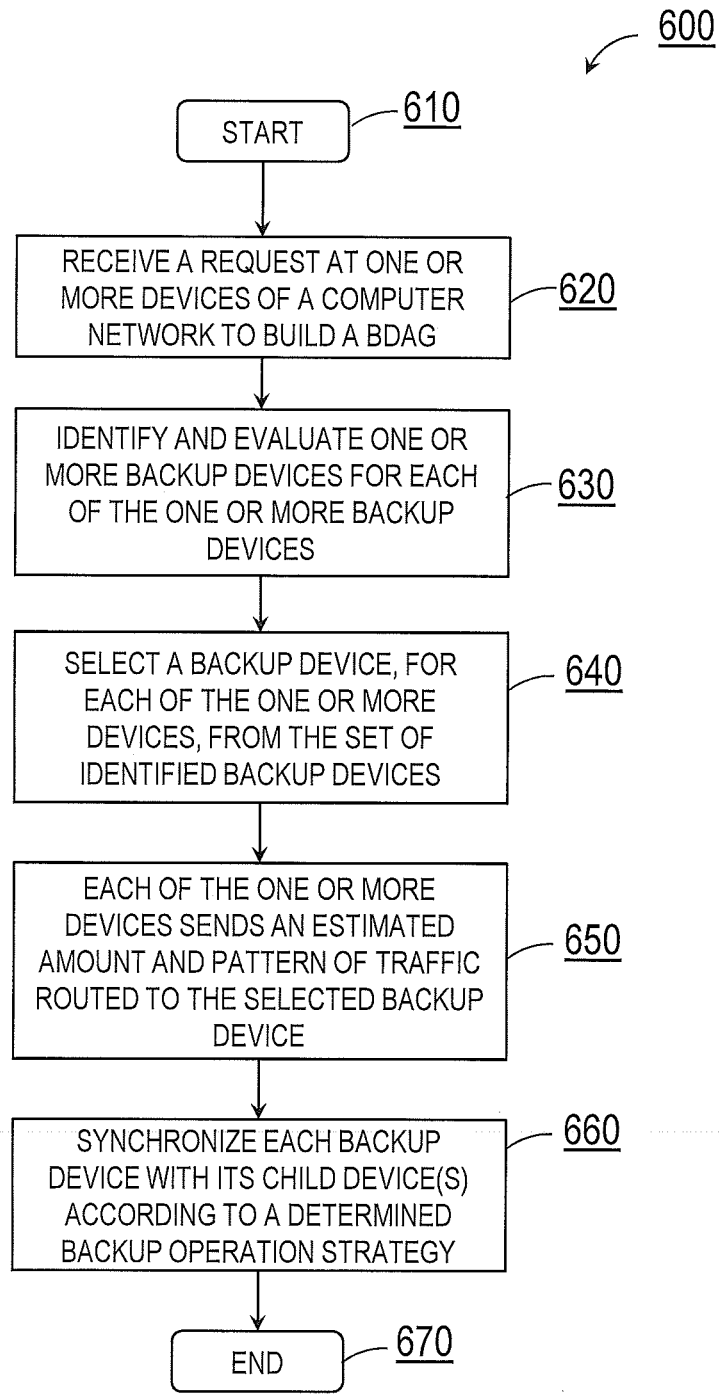
FIG. 6 is a flow chart diagram of another BDAG process used for building a backup DAG (BDAG) in accordance with an example embodiment.

Reference is now made to FIG. 6 which is a flow chart diagram of a BDAG process 600 used for building a BDAG in accordance with an embodiment of the present invention (hereinafter referred to as the distributed BDAG pre-computation).

The process starts at step 610 and then, continues at step 620 where one or more devices 200 within the computer network 100 (e.g. an IoT network) receive a request to build a BDAG usable in the event of a power outage. Typically, backup paths are pre-computed to build a BDAG based on a certain OF, such as through a BDAG discovery request (e.g. DIO) 300.

At step 630, some or all devices 200 of the computer network 100, which received the request, start identifying and evaluating one or more next-hop candidates to be used as backup devices. As described hereinabove, the devices 200 evaluate the candidate backup devices based on the OF included in the request. Notably, the included OF may actually consist of a default OF, or alternatively an OF my not be included at all, in which case the receiving devices operate in a configured manner to handle requests without specified OFs. Also, the devices 200 may select the backup devices according to a backup OF (BOF) which may be, for example, but without limiting the generality of the invention, stricter than the initial OF in terms of policy. In another non-limiting example, the BOF may favor a different "goal" such as trying to minimize the number of hops to the destination as opposed to an initial ETX metric, thereby leading to the selection of different backup devices. Those skilled in the art will appreciate that the present invention is not limited to these particular BOF examples and that, on the contrary, different BOFs may be defined by adding, removing or relaxing different metrics and/or constraints. Furthermore, the nature of the backup devices is also taken into consideration for the selection of the preferred backup device as explained hereinabove in relation to step 530 of FIG. 5. At the end of step 630, a set of backup devices that fulfill the specified one or requirements is identified for each device 200 that received the request to build a BDAG.

At step 640, a backup device is selected, among the set of backup devices, for each device 200 of the computer network 100 that received the request to build the BDAG. Typically, the backup device which best satisfies the one or more metrics (and fulfills the one or more requirements) of the OF is selected for each device 200.

Then, the process moves to step 650 where each device 200 that was requested to build a BDAG communicates with its selected backup device and typically sends an estimate of an amount as well as a pattern of the re-routed traffic that will be received by the selected backup device in the event of a power outage. Additionally and/or alternatively, each device 200 may send an estimate of critical re-routed traffic to the selected backup device. Sending an estimate of the critical re-routed traffic typically includes sending an estimate (e.g. based on historical observations analyzed by a machine-learning (ML) algorithm) of the number of data packets along with their patterns that need to be preserved and re-routed in case of power outage. A ML is generally concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning. Therefore, a machine-learning (ML) algorithm may be used and implemented in or more devices 200 of the computer network 100 to provide the estimates. Then, the estimates and the patterns are sent using a newly specified IPv6 link local message. At this point, all the selected backup devices receive the messages from all their child devices, i.e. the devices 200 that have selected them as a backup device. As noted hereinabove, a particular device may be selected as a backup device by one or more devices 200 (i.e. child devices). In such a situation, the selected backup device typically receives a plurality of messages, each of them coming from a different child device 200.

Upon reception of these messages, each backup device may be able to determine a backup operation strategy. Determining a backup operation strategy typically includes computing an amount of re-routed traffic that will be received by a backup device from its child devices at different times in case of power outage. Subsequently, a backup device is able to define an amount of link capacity to allocate to each child device as well as defining a unicast schedule for receiving the re-routed traffic from all its child devices. Additionally and/or alternatively, while defining a unicast schedule, the backup device may be able to specify a number of time slots during backup recovery for each child device. Indeed, the backup device may determine that the backup link capacity should be unequally shared among the child device to handle and/or receive the computed amount of re-routed traffic. Optionally, a backup device may determine that its backup capacity is less than the computed amount of re-routed traffic that is to be received from the child devices. In such a situation, the backup device may define and apply the traffic policy in order to discard some data packets 140 of the re-routed traffic. Typically, a traffic policy may identify particular data packets 140 as of low importance and therefore, may discard them. Additionally and/or alternatively, the traffic policy may specify that a particular type of traffic and/or data packets 140 is to be discarded. Additionally and/or alternatively, the backup device may notify its child devices about the traffic policy so that the child devices do not route traffic and/or type of traffic not accepted by the backup device. Those skilled in the art will appreciate that different traffic policies may be defined and applied for discarding some data packets 140 in order to avoid backup link congestion.

Further, at step 660, a synchronization process is initiated between each backup device and its child devices thereby enabling each backup device-child device pair to communicate. The synchronization process is similar to the one described hereinabove in relation to step 550 of FIG. 5. Those skilled in the art will appreciate that pre-synchronizing the backup devices with its child devices allows faster switch-over of traffic along the created BDAG. At the end of step 660, the BDAG is built and ready to be used in the event of a power outage.

The process ends at step 670.

Figure 7:
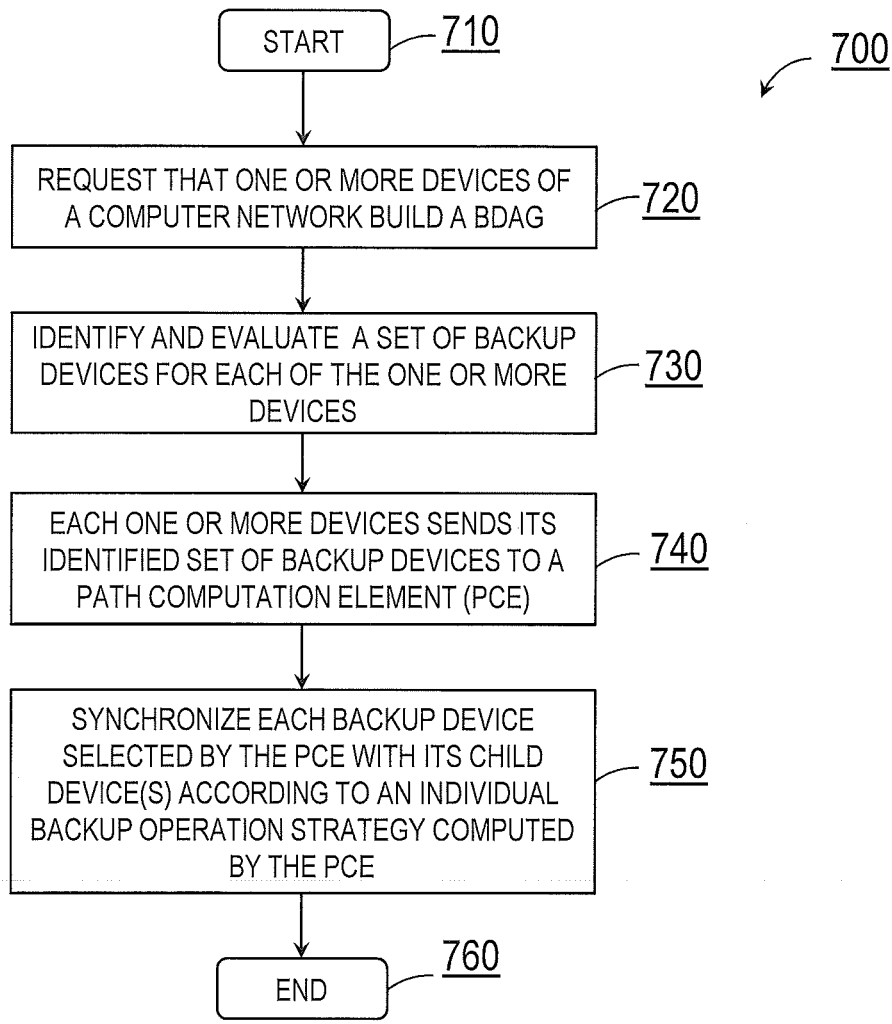
FIG. 7 is a flow chart diagram of a further BDAG process used for building a BDAG in accordance with an example embodiment.

Reference is now made to FIG. 7 which is a flow chart diagram of a BDAG process 700 used for building a BDAG in accordance with an embodiment of the present invention (hereinafter referred to as the path computation element based BDAG pre-computation).

The process starts at step 710 and then continues at step 720 where one or more devices 200 within the computer network 100 (e.g. an IoT network) receive a request to build a BDAG usable in the event of a power outage. Typically, backup paths are pre-computed to build a BDAG based on a certain OF, such as through a BDAG discovery request (e.g. DIO) 300.

At step 730, some or all devices 200 of the computer network 100, which received the request, start identifying and evaluating one or more next-hop candidates to be used as backup devices. The identification and evaluation processes are similar to the ones described in step 630 in relation with the description of FIG. 6 for the distributed based BDAG pre-computation. Notably, each device 200 may identify and evaluate one or more next-hop candidates based on the OF included in the initial request or based on a BOF. Also, the nature of candidate backup devices is taken into consideration during these processes. At the end of step 730, a set of backup devices is identified by each device 200 of the computer network 100.

The process then continues at step 740 where each device 200 sends information relevant to its identified set of backup devices to a path computation element (PCE). A PCE is a system component, application, or network node that is capable of determining and finding a suitable route for conveying data packets between a source and a destination. In RPL, the PCE is typically located at the root device (as illustrated on FIG. 4). However, the PCE may be located in any suitable node/device 200 of the computer network 100 as long as the node/device 200 is able to host the POE. Also, the identified set of backup devices may be piggybacked using the RPL routing protocol DAD messages as specified in an IETF Internet Draft, entitled "RPL: IPv6 Routing Protocol for Low-Power and Lossy Networks" by Winter, et al. (March, 2012 version). In the non-storing mode of operation, the DAD message may be unicast to the root device, and typically includes a transit information option 326 that specifies the set of (compressed) backup devices for the BDAG. Additionally and/or alternatively, the link characteristic (e.g. link quality, bandwidth, etc.) between the device 200 and each backup device of the set of backup devices may be specified in the message and reported to the PCE along with the set of backup devices.

In certain example embodiments, the PCE is in charge of determining an overall backup strategy for the one or more devices 200 of the computer network 100 that were requested to build the BDAG. Typically, the PCE receives all the sets of backup devices for the different devices 200 of the computer network 100 and starts determining the overall backup operation strategy. In this situation, determining an overall backup operation strategy typically includes selecting one backup device for each of the devices 200 as well as determining an individual backup operation strategy (i.e. an amount of link capacity of the selected backup device to allocate to each child device as well as defining a unicast schedule for receiving the re-routed traffic from all its child devices) for the backup devices. In contrast to the distributed BDAG pre-computation approach, the PCE-based BDAG pre-computation approach allows taking into consideration additional parameters, such as the overall set of backup links and the traffic matrix, for determining the overall backup operation strategy. A traffic matrix typically represents the volumes of traffic from sources to destinations in a network. In the PCE-based BDAG pre-computation mode of operation, the traffic matrix of the computer network 100 can be computed by the PCE in both non-storing and storing modes. Indeed, in non-storing mode, the PCE can compute the traffic matrix since all the traffic transits through the root device where the PCE is located while, in the storing mode, the traffic matrix can be computed by collecting short-cut traffic statistics for the traffic not transiting through the root device according to well-known techniques. The PCE is therefore able to select one backup device from the set of backup devices for each device 200 of the computer network 100. Furthermore, the PCE is also able to determine an amount of link capacity of the selected backup device to allocate to each child device as well as defining a unicast schedule for receiving the re-routed traffic from all its child devices (individual backup operation strategies). Also, since the PCE has a global view of the computer network 100 and the traffic within the computer network 100, collisions domains may be taken into account when determining the individual backup operation strategies. A collision domain is a section of a network where data packets can collide with one another when being sent on a shared medium or through repeaters. Typically, a network collision occurs when more than one device attempts to send a packet on a network segment at the same time. Consequently, the individual backup operation strategies may be refined thereby increasing the robustness of the BDAG in the event of power outage. Also, by having a global view of the computer network 100 (e.g. by knowing the traffic matrix and collisions domains), the PCE is able to define a more refined traffic policy for the BDAG. Typically, in a situation where the PCE determines that the overall backup capacity is too small for the overall re-routed traffic, it is able to specify a stricter traffic policy thereby leading to having each backup device restricting even more the type of accepted traffic. In other words, the refined traffic policy may be sent to each backup device notifying them to restrict even more the allowed traffic and/or type of accepted traffic. Additionally and/or alternatively, the backup device may notify its child devices 200 about the refined traffic policy so that the child devices 200 do not route traffic and/or type of traffic not accepted by the backup device.

At this point, the selected backup devices receive their individual operation strategy from the PCE. Typically, the PCE notifies each backup device about its individual backup operation strategy using a unicast IPv6 message (e.g., a constrained application protocol (CoAP) message, i.e., a software layer protocol allowing small low power sensors, actuators, etc. to communicate in resource-constrained networks). The unicast IPv6 message typically defines an amount of link capacity to allocate to each child device, a unicast schedule for receiving the re-routed traffic from all its child devices and a traffic policy.

Upon reception of these messages, each backup device will initiate the synchronization process with its child devices at step 750 as explained hereinabove in relation to FIG. 6 (step 660). At the end of step 750, the BDAG is built and ready to be used in the event of a power outage.

The process ends at step 760.

It should be noted that FIGS. 5-7 are merely examples for illustration, and are not meant to be limiting to the scope of the embodiments herein. For instance, while certain steps within the BDAG processes 500 through 700 may be optional as described above, certain steps may be included or excluded as desired, and the steps may also be in a different order where suitable.

While there have been shown and described illustrative embodiments that enhance power outage management through pre-computation of a backup topology, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those utilizing DAG routing (e.g., distance vector protocols). At the same time, however, the embodiments above are not limited to DAG routing, and may utilize other forms of route-topology management.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device of a computer network, a request to build at least part of a backup directed acyclic graph (BDAG) of backup devices for routing traffic within the computer network in case of a power outage, the request comprising at least one requirement specifying to use a device remaining powered after the power outage as a backup device; and
   in response to receiving the request:
   identifying a set of backup devices, each of the backup devices fulfilling the at least one requirement;
   selecting a backup device from the set of backup devices; and
   synchronizing the device with the backup device according to a backup operation strategy.

2. The method of claim 1, wherein said backup operation strategy comprises defining a link capacity and a unicast schedule allocated by the backup device to the device for routing the traffic in case of a power outage.

3. The method of claim 1, wherein identifying comprises reading an indicator that indicates whether the backup device is expected to be affected by the power outage.

4. The method of claim 3, wherein the indicator further indicates how the backup device is expected to be affected by the power outage.

5. The method of claim 4, wherein the indicator indicates that a backup device has a remaining lifetime after the power outage that is more than a threshold value.

6. The method of claim 1, wherein identifying comprises reading a time-length value (TLV) that indicates at least one of: an estimated remaining lifetime after the power outage; or an electrical distribution feeder.

7. The method of claim 6, wherein the TLV indicates that a backup device has a remaining lifetime that is more than a threshold value and/or indicates that the backup device has a different distribution feeder than the device.

8. The method of claim 1, further comprising:
   receiving a traffic policy to use for routing the traffic to the selected backup device, the traffic policy specifying how to reduce the traffic routed to the selected backup device in case of the power outage.

9. The method of claim 8, wherein the traffic policy specifies at least one of: a particular type of traffic accepted by the selected backup device; or an amount of traffic accepted by the selected backup device.

10. The method of claim 1, wherein the receiving, identifying, selecting and synchronizing steps are performed by a plurality of devices within the computer network to build the BDAG for routing traffic within the computer network in case of the power outage.

11. A method comprising:
    receiving, at a backup device of a computer network, an estimate of an amount and a pattern of traffic that will be routed from one device of the network to the backup device in case of a power outage;
    computing a backup operation strategy for the backup device, the backup operation strategy defining a link capacity and a unicast schedule allocated by the backup device to the one device for routing the traffic in case of the power outage; and
    synchronizing the backup device with the one device using the computed operation backup strategy.

12. The method of claim 11, wherein the backup device is selected as a backup device for both the one device and at least one additional device; and wherein the backup operation strategy of the backup device defines a link capacity and a unicast schedule allocated by the backup device to each of the one device and the at least one additional device.

13. The method of claim 12, further comprising:
    computing an overall amount of traffic expected to be received at the backup device in case of the power outage;
    defining a traffic policy for the backup device, the traffic policy specifying how to reduce the traffic routed to the selected backup device in case of the power outage; and
    applying the traffic policy if a backup device capacity is less than the computed overall amount of expected traffic.

14. The method of claim 13, wherein the traffic policy specifies at least one of: a particular type of traffic accepted by the backup device; or an amount of traffic accepted by the backup device for each of the one device and the at least one additional device.

15. A method comprising:
    receiving, at a path computation element (PCE), information identifying a set of backup devices for one device of a computer network that received a request to build a backup directed acyclic graph (BDAG), the request comprising at least one requirement specifying to use a device remaining powered after the power outage as a backup device, and wherein, each backup device of the set of backup devices fulfills the at least one requirement;
    selecting one backup device from the set of backup devices;
    computing a backup operation strategy using a traffic matrix and collision domains of the computer network, the backup operation strategy defining a link capacity and a unicast schedule allocated by the selected backup device to the one device for routing the traffic in case of a power outage; and
    sending the computed backup operation strategy to the selected backup device for later synchronization with the one device.

16. The method of claim 15, wherein the receiving, selecting, computing and sending steps are performed for a plurality of devices within the computer network to build the BDAG for routing traffic within the computer network in case of the power outage.

17. The method of claim 16, wherein one backup device is selected by the PCE for one device and at least one additional device; and wherein the computed backup operation strategy defines a link capacity and a unicast schedule allocated by the one backup device to each of the one device and the at least one additional device.

18. The method of claim 17, further comprising:
computing an overall amount of traffic received at each of the selected one backup device in case of power outage using the traffic matrix and the collision domains;
defining a traffic policy specifying how to reduce the traffic routed to each of the selected one backup device; and
sending the traffic policy to each of the selected one backup device, the traffic policy being applied if one of the selected one backup device capacity is less than the computed overall amount of traffic.

19. The method of claim 18, wherein the traffic policy specifies at least one of: a particular type of traffic accepted by the backup device; or an amount of traffic accepted by the backup device.

20. The method of claim 15, wherein the PCE is located at a root device of the BDAG.

21. An apparatus, comprising:
one or more network interfaces to communicate with one or more devices of a computer network;
a processor coupled to the one or more network interfaces and adapted to execute one or more processes; and
a memory configured to store a process executable by the processor, the process when executed being operable to:
receive a request to build at least a part of a backup directed acyclic graph (BDAG) for routing traffic within the computer network in case of a power outage, the request comprising at least one requirement specifying to use a device remaining powered after the power outage as a backup device; and
in response to the received request:
identify a set of backup devices, each backup device of the set of backup devices fulfilling the at least one requirement;
select a backup device from the set of backup devices; and
synchronize with the backup device according to a backup operation strategy received from the backup device.

22. An apparatus, comprising:
one or more network interfaces to communicate with one or more devices of a computer network;
a processor coupled to the one or more network interfaces and adapted to execute one or more processes; and
a memory configured to store a process executable by the processor, the process when executed being operable to:
receive an estimate of an amount and a pattern of traffic that will be routed from one device of the network in case of a power outage;
compute a backup operation strategy, the backup operation strategy defining a link capacity and a unicast schedule allocated to the one device for routing the traffic in case of the power outage; and
synchronizing with the one device using the computed operation backup strategy.

23. An apparatus, comprising:
one or more network interfaces to communicate with one or more devices of a computer network;
a processor coupled to the one or more network interfaces and adapted to execute one or more processes; and
a memory configured to store a process executable by the processor, the process when executed being operable to:
receive information identifying a set of backup devices for one device of a computer network that received a request to build a backup directed acyclic graph (BDAG), the request comprising at least one requirement specifying to use a device remaining powered after the power outage as a backup device, and wherein, each backup device of the set of backup devices fulfills the at least one requirement;
select one backup device from the set of backup devices;
compute a backup operation strategy using a traffic matrix and collision domains of the computer network, the backup operation strategy defining a link capacity and a unicast schedule allocated by the selected backup device to the one device for routing the traffic in case of a power outage; and
send the computed backup operation strategy to the selected backup device for later synchronization with the one device.

* * * * *